United States Patent [19]

Olsson

[11] Patent Number: 4,631,656
[45] Date of Patent: Dec. 23, 1986

[54] MOUNTING FOR ELECTRICAL CONVERTER VALVE ASSEMBLY

[75] Inventor: Karl-Erik Olsson, Ludvika, Sweden

[73] Assignee: Asea Aktiebolag, Västerås, Sweden

[21] Appl. No.: 621,286

[22] Filed: Jun. 15, 1984

[30] Foreign Application Priority Data

Jun. 16, 1983 [SE] Sweden ............................ 8303459

[51] Int. Cl.⁴ ........................................... H02M 7/757
[52] U.S. Cl. ...................................... 363/123; 174/42; 363/144
[58] Field of Search ................. 363/13, 35, 68, 123, 363/126, 129, 141, 144; 174/42, 43, 150

[56] References Cited

U.S. PATENT DOCUMENTS

| | | | |
|---|---|---|---|
| 2,708,686 | 5/1955 | Bernard, Jr. et al. | 174/43 X |
| 3,726,986 | 4/1973 | Higaki et al. | 174/43 |
| 4,012,581 | 3/1977 | Hawkins | 174/42 |
| 4,188,502 | 2/1980 | Gagné | 174/42 |
| 4,277,639 | 7/1981 | Olsson | 174/43 X |
| 4,305,121 | 12/1981 | Lack et al. | 363/141 |
| 4,318,169 | 3/1982 | Olsson | 363/123 |

Primary Examiner—Philip H. Leung
Attorney, Agent, or Firm—Pollock, Vande Sande & Priddy

[57] ABSTRACT

A static electrical converter for high voltage DC is provided with at least one valve assembly which has one or more valves electrically connected in series. Each of these valves includes a plurality of valve modules carried by a carrier for dependent mounting. The valve modules are connected to the carrier with the aid of resilient members allowing vertical spring movement between the valve modules and the upper portion formed for suspension of the carrier.

14 Claims, 11 Drawing Figures

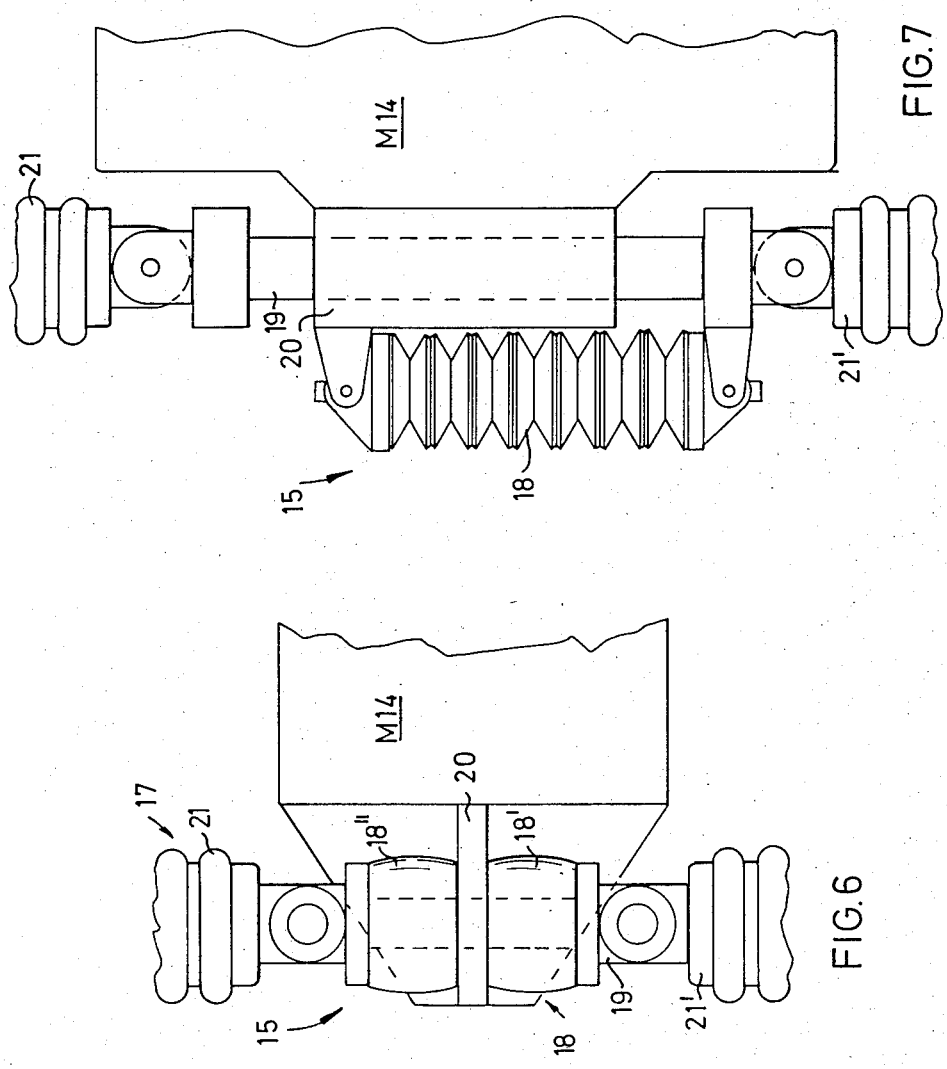

4,631,656

MOUNTING FOR ELECTRICAL CONVERTER VALVE ASSEMBLY

FIELD OF THE INVENTION

The invention relates to a static electrical converter, particularly for high voltage DC, including at least one valve assembly with one or more valves electrically connected in series, each having a plurality of valve modules which are carried by a support means included in the assembly and formed for dependent mounting.

BACKGROUND OF THE INVENTION

In electrical converters for high voltages it has previously been customary to build the valve assemblies included in the converter as vertical columns resting on a sub-structure with the valves in a valve assembly placed one on top of the other. This requires a plurality of vertical support insulators which are subjected to very large forces, particularly with large valve assemblies and during earthquakes, for example. In an improved embodiment according to U.S. Pat. No. 4,318,169 such a converter has been given greater resistance to earthquakes by mounting its valve assemblies dependently and by including resilient members in the suspension means for a valve assembly, these members allowing relative vertical movement between the valve assembly and the supporting structure in which it is suspended. However, such an embodiment requires the building or corresponding carrying structure in which suspension takes place to be specially implemented so that space is made from the start for the resilient members.

OBJECT OF THE INVENTION

The object of the invention is to provide a converter which can be more simply mounted dependent in different types of carrying structures but which can even so well withstand forces such as those from earthquakes.

This is achieved in accordance with the invention in that the valve modules are joined to the carrying means with the aid of resilient members allowing vertical relative movement between the valve modules and the upper part of the carrying means, this part being formed for suspension.

By implementing the converter in this way, it will be possible later on simply to supplement and alter a converter which was not initially provided with resiliency, for example. Furthermore, it will also be possible to give a softer suspension than previously to the valve modules included in the converter, thus reducing stresses on the structure.

BRIEF DESCRIPTION OF THE DRAWINGS

The invention will now be explained, by way of example, with reference to the appended drawings, wherein FIGS. 6, 7, 8, 9a, 9b and 10 illustrate embodiments of the type of resilient members illustrated in FIG. 4.

DETAILED DESCRIPTION

Figure 1:
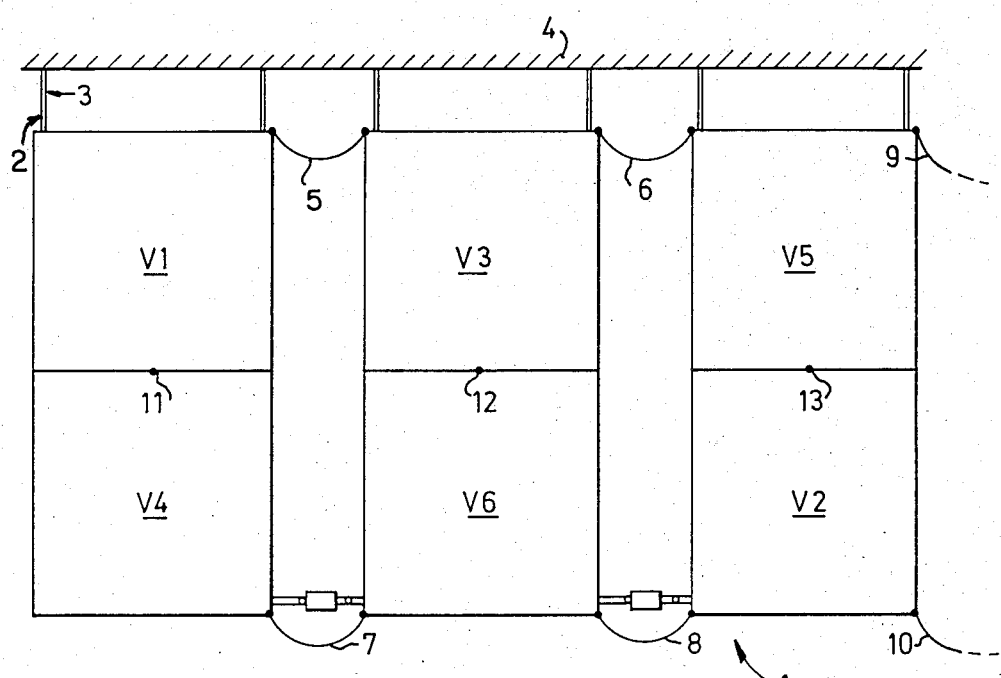
FIG. 1 is a side view of a static electrical converter in accordance with the invention.
Figure 2:
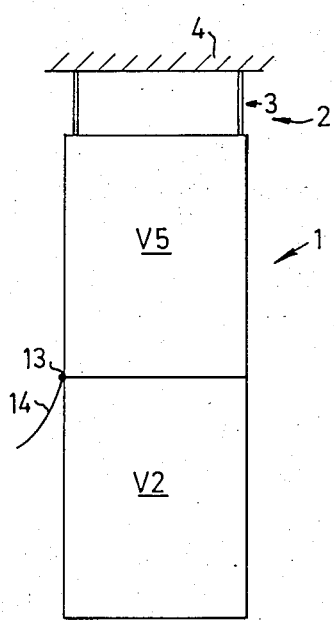
FIG. 2 is an end view of the converter illustrated in FIG. 1.

FIGS. 1 and 2 illustrate a static electrical converter 1 made in accordance with the invention, as seen from two mutually perpendicular directions. There are six valves V1–V6 included in the converter, forming in pairs the valve assemblies V1–V4, V3–V6 and V5–V2 of the converter 3. Each valve assembly comprises a vertical column with the valves in the assembly situated under each other. A carrying means 2 is included in each valve assembly, this means having an upper part via which the assembly can be mounted dependent in a carrying structure in a fixed or movable object, e.g., the ceiling or roof of a building.

The upper ends of the valve assemblies are electrically connected with the aid of conductors 5 and 6. In the same way, the lower ends of the valve assemblies are electrically connected with the aid of conductors 7 and 8. A conductor 9 is connected to the valve V5, this conductor constituting one DC terminal of the converter. The other DC terminal of the converter is a conductor 10 connected to the valve V2. The converter has three AC connections 11, 12, 13 each being connected via a conductor to a converter transformer (not shown), and of these only the conductor 14 connected to the connection 13 is shown in FIG. 2. The electrical construction of converters of the type intended here is well-known to those skilled in the art and therefore does not need to be described in detail. Reference is made to the U.S. Pat. No. 4,318,169 mentioned in the introduction, should further details be of interest.

Figure 3:
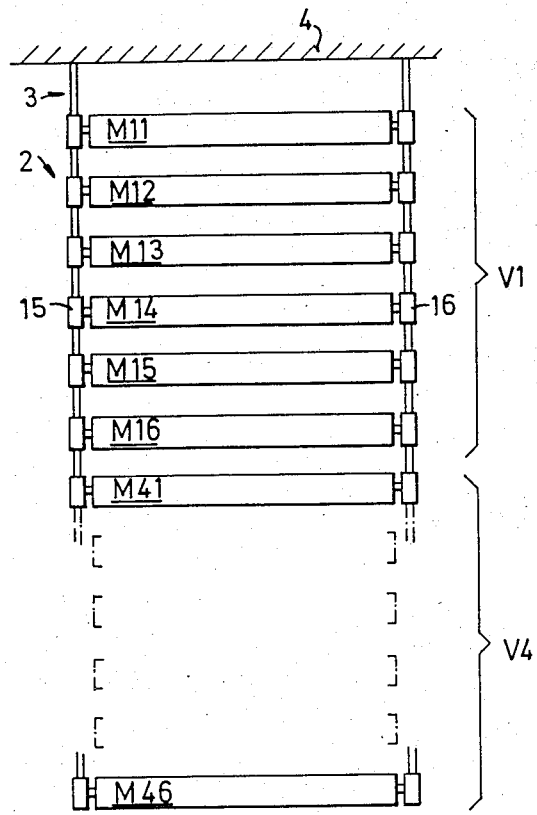
FIG. 3 is a side view of a valve assembly.

The more specific construction of the valve assembly V1–V4 will be seen from FIG. 3. A plurality of valve modules M11–M16, separated in height, are included in the valve V1, each of these modules constituting a mechanically self-supporting unit including necessary electrical equipment. In turn, these valve modules can be built up from the requisite number of sub-modules and can possibly have masses of different sizes. Each of the valve modules M11–M16 is connected to the carrying means 2 by a suitable number of resilient members allowing vertical mutual movement between the valve module and the upper part 3 of the carrying means, this part being formed for suspension. For example, the valve module M14 is suspended on either side from the carrying means 2 with the aid of resilient members 15 and 16. The valve V4 is built up in a corresponding way. The implementation of the carrying means 2 may of course be varied in a multitude of different ways depending on the size and implementation of the valves and valve modules it is to support. What is vital, however, is that good electrical insulation be obtained between adjacent valve modules and of course between the valve assembly and the carrying structure 4 in which it is suspended.

Figure 4:
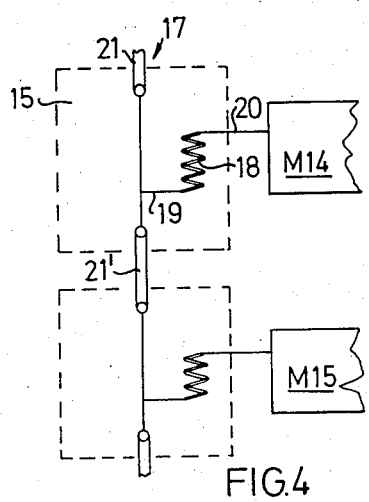
FIGS. 4 and 5 illustrate two fundamentaly different variants of resilient members included in a valve assembly.
Figure 5:
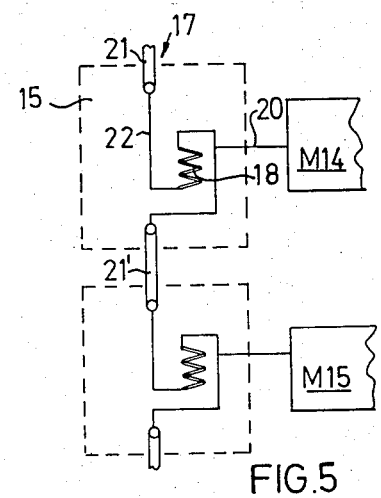

The resilient members 15 and 16 can be made in many different ways, depending on what resiliency properties are desired. Two fundamentally different embodiments are shown in FIGS. 4 and 5. In the embodiment illustrated in FIG. 4 there is included in the carrying means 2 a vertical elongate carrier member 17 which is substantially rigid in its vertical direction. Via a spring device 18, each valve module can move individually in a vertical direction relative to the carrier member 17 and of course also relative the upper part 3 in the carrying means 2 connected to the support structure 4. Via a first support 19, the spring device 18 is connected to the carrier member 17, and via a second support 20 it is connected to the valve module. The support 19 is included in the carrier member 17 where it joins together insulating links 21, 21'. There is of course nothing to prevent the carrier member 17 from being insulating along its entire length and it could, for example be made from a threaded rod of suitably electrically insulating material.

In FIG. 5, the spring device 18 is instead solely connected to the insulating link 21 via a first support 22 and to a valve module via a second support 10. In this case, the second support 20 is coupled to the insulating link 21'. In this way the spring device 18 will not only be loaded by its own valve module but also by all underlying valve modules with associated parts included in the carrying means 2. In this case it is suitable to give the upper spring devices 18 a larger spring constant than the lower spring devices 18.

Figure 10:
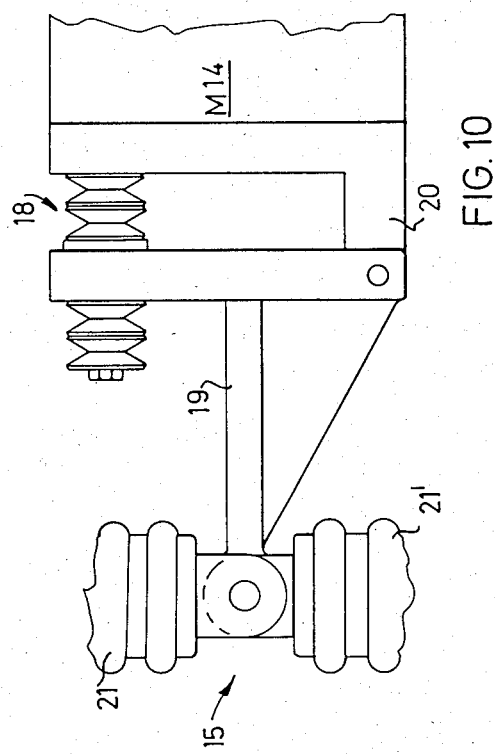
Figure 8:
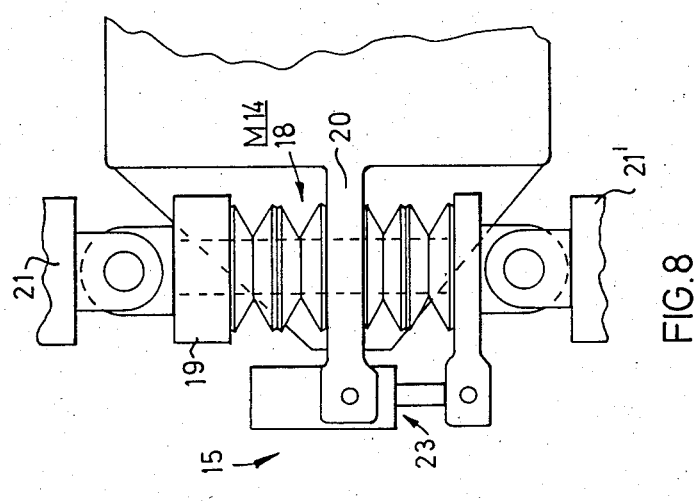
Figure 9B:
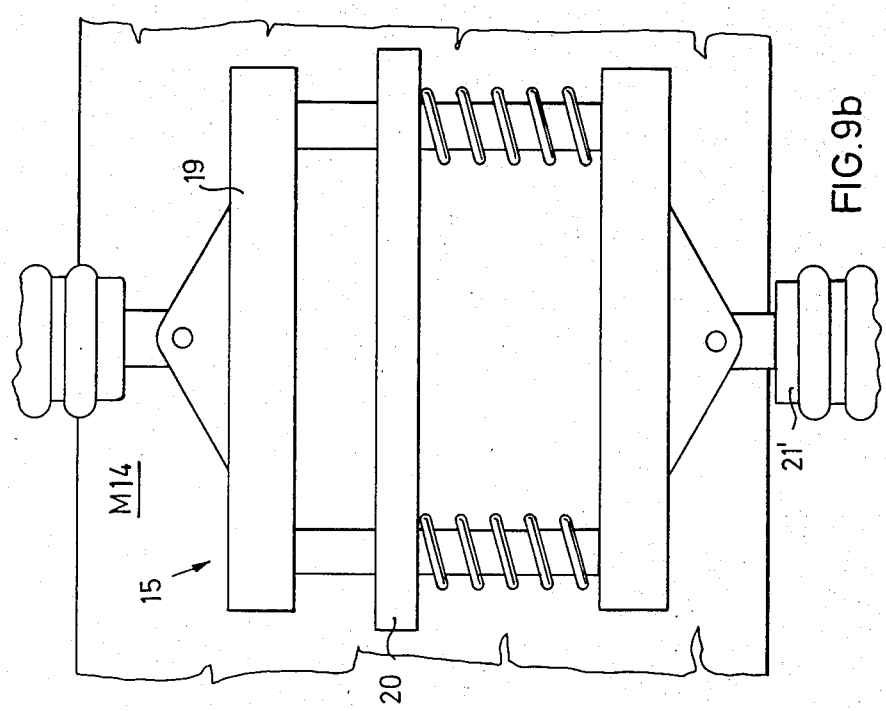
Figure 9A:
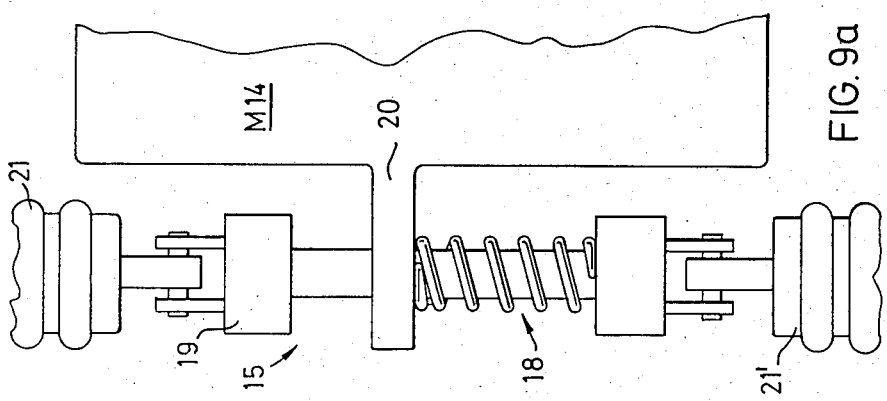

Starting from the fundamentally different solutions illustrated in FIGS. 4 and 5, the resilient members 15 can be varied in many different ways, all according to need and desire. Some different embodiments based on the principle illustrated in FIG. 4 are shown in FIGS. 6 to 10 by way of clarification. In FIG. 6, the spring device 18 comprises rubber cushions 18' and 18" mounted on the first support 19 and situated on either side of the second support 20. In FIG. 7, the spring device 18 comprises a conical disc spring confined between the upper end of the second support 20 and the lower end of the first support 19. In FIG. 8, the spring device 15 has a construction similar to that of FIG. 6, the difference being that the resilient means is of the conical disc spring type and that between the first support 19 and the second support 20 there is mounted a shock absorber 23, e.g., of hydraulic type. FIGS. 9a and 9b show a spring device 15 seen from two directions at right angles to each other. The first support 19 and the second support 20 are here formed to allow mounting of parallel helical springs included in the spring device 18. In FIG. 10, the first support 19 and the second support 20 are articulatedly joined to each other so that relative movement between them is counteracted by the spring device 18.

The execution of different embodiments of the fundamental solution illustrated in FIG. 5 for a resilient member 15 should not cause one skilled in the art any difficulties, taking into account the embodiments discussed above for the principal solution according to FIG. 4.

In order to prevent undesired, undamped oscillations (spring movements) in the resilient members, it would appear to be suitable in practice that the resilient members be either movement-damping resilient means such as conical disc springs, rubber springs etc., and/or parallel-coupled special movement-damping means.

It has been illustrated hereinbefore that substantially each tier of the valve assemblies has been mounted resiliently. There is of course nothing to prevent several valve module tiers being cumulated for example, so that larger units are obtained, thus enabling the reduction of the number of resilient members, but in return they would have to be made more substantial. In any case, it is possible, with the aid of the technique illustrated here, and without any great interference in the carrying structure, to alter the vertical springing capacity for units included in a static electrical converter in accordance with the invention. It should be noted here that equipment for preventing lateral oscillation of the valve assemblies has not been included in this connection, since such equipment is well-known to those skilled in the art.

What I claim is:

1. A static electrical converter, particularly for high voltage DC, including at least one valve assembly with one or more valves electrically connected in series, each of said valves having a plurality of valve modules carried in a carrier means included in the valve assembly and adapted to be dependently mounted, wherein the valve modules are suspended under each other and are each connected to the carrier means by resilient members allowing relative vertical movement between the valve modules and between the valve modules and an upper part of the carrier means, said upper part being adapted to be suspended from a carrier structure.

2. Converter as claimed in claim 1, wherein vertical elongate carrier members are included in the carrier means, and the resilient members are joined to such carrier members, attachment points on such members for the resilient members of different valve modules being vertically spaced from one another.

3. Converter as claimed in claim 2, wherein to each resilient member there is associated a first part included in said carrier means and a second part joined to a valve module, a spring device coacting with the parts for counteracting mutual vertical movement between said first and second parts.

4. Converter as claimed in claim 3, wherein the spring device is carried by the first part and is loaded by the valve module via the second part.

5. Converter as claimed in claim 3 or 4, characterized in that the first and the second parts are also connected via a damping means.

6. Converter as in claim 3, wherein the first parts in adjacent resilient members are connected to each other by electrically insulating means.

7. Converter as claimed in claim 1, characterized in that the valve modules are mechanically coupled in series to each other by means including the resilient members.

8. Converter as claimed in claim 7, including a damping means, coupled in parallel with each resilient member.

9. Converter as claimed in claim 7, wherein the resilient members are connected to each other with the aid of electrically insulating means.

10. Converter as claimed in claim 9, wherein each resilient member has a spring device which is coupled to an insulating means above it and which, with the exception of the lowermost valve module, is also coupled to an insulating means below it.

11. Converter as claimed in any one of claims 1, 2 to 4 and 6 to 10, wherein the resilient members comprise movement-damping spring means.

12. Converter as claimed in claim 11, wherein the movement-damping spring means comprise conical disc springs.

13. Converter as claimed in claim 11, wherein the movement-damping spring means comprise rubber springs.

14. Converter as claimed in claim 11, wherein the resilient members comprise movement-damping means connected in parallel.

* * * * *